June 28, 1966     G. L. GALANTE ETAL     3,258,652
PANELBOARD INCLUDING ROTATABLE LOCKING BAR PASSING THROUGH SLOT
IN CIRCUIT BREAKER ASSEMBLIES FOR PREVENTING UNAUTHORIZED
REMOVAL OF ASSEMBLIES FROM PANELBOARD Filed Dec. 19, 1963     2 Sheets-Sheet 1

INVENTORS
GEORGE L. GALANTE,
ROBERT J. SABATELLA
BY Robert A. Casey
ATTORNEY

June 28, 1966 G. L. GALANTE ETAL 3,258,652
PANELBOARD INCLUDING ROTATABLE LOCKING BAR PASSING THROUGH SLOT
IN CIRCUIT BREAKER ASSEMBLIES FOR PREVENTING UNAUTHORIZED
REMOVAL OF ASSEMBLIES FROM PANELBOARD
Filed Dec. 19, 1963 2 Sheets-Sheet 2

INVENTORS
GEORGE L. GALANTE,
ROBERT J. SABATELLA
BY Robert T. Casey
ATTORNEY

United States Patent Office 3,258,652
Patented June 28, 1966

3,258,652
PANELBOARD INCLUDING ROTATABLE LOCKING BAR PASSING THROUGH SLOT IN CIRCUIT BREAKER ASSEMBLIES FOR PREVENTING UNAUTHORIZED REMOVAL OF ASSEMBLIES FROM PANELBOARD
George L. Galante, Plainville, and Robert J. Sabatella, Southington, Conn., assignors to General Electric Company, a corporation of New York
Filed Dec. 19, 1963, Ser. No. 331,755
10 Claims. (Cl. 317—119)

This invention relates to electric circuit control device panelboards, and more particularly to panelboards including means for preventing the removal and replacement of circuit control devices thereon by unauthorized personnel.

Circuit control device panelboards or "load centers" are in wide use in residential applications as service-entrance equipment, from which electrical power brought into a house is distributed through separate circuits to respective electrical outlets and appliances. The circuit control devices in such load centers are constructed for ease of insertion and removal so that a given installation may be assembled in building-block fashion from standard components to meet requirements of the particular loads contemplated and to permit ease of modification at a subsequent date when new circuits may be required to add to a basic installation.

For adequate protection of such branch circuits, it is necessary that each such circuit have associated with it a circuit control device such as a circuit breaker or fuse of an ampere rating corresponding to the capacity of the wiring used in the circuit. For additional safety, it is required that such panel assemblies include means for preventing the user from removing a given circuit breaker or fuse and substituting therefor a circuit breaker or fuse of higher ampere rating.

One means for providing such protection, in accordance with the prior art, has been to provide a locking means or "locking bar" which locks all circuit breakers or fuse-blocks in place, and which can be removed only by partial disassembly of the panel, thus discouraging the user from making such undesired substitutions. A panel assembly of this type is shown, for example, in co-pending application Serial No. 108,440 filed May 8, 1961, by Robert E. Bristol and assigned to the same assignee as the present invention.

Such prior art locking bar constructions are particularly well suited for panel assemblies including individual circuit control devices which are mounted in two closely adjacent rows comprising a series of pairs of circuit control devices mounted in end-to-end substantially abutting relation.

In certain panel arrangements, however, such end-to-end pairs of circuit control devices may comprise an integral part of a single assembly or casing, such an assembly being referred to for convenience as a "tandem" assembly. With such "tandem" constructions, a locking bar of the type shown in the aforementioned Bristol application would have certain disadvantages. For example, it would be necessary that the locking bar be completely removed from in front of the assembly of circuit control devices before any devices could be inserted or withdrawn. This is somewhat inconvenient, and creates the possibility that the locking bar may be mislaid and not replaced.

It is an object of the present invention to provide a circuit control device panel assembly of the locking bar type to prevent the unauthorized interchanging of devices, which system is particularly adapted for use with circuit control device assemblies of the "tandem" type.

It is another object of the invention to provide such a circuit control device panel assembly which does not require the use of special tools in order to permit insertion or removal of devices and which at the same time provides a substantial deterrent to the ordinary user to prevent him from making unauthorized insertion or removal of circuit control devices.

It is another object of the invention to provide such a panel construction including means for preventing the unauthorized insertion or removal of circuit control devices, which removal preventing means also provides the useful function of mechanically retaining the devices in place on the panel assembly.

By way of a brief summary of a preferred form of the invention, an electrical panel assembly is provided comprising electric circuit control devices of the automatic circuit breaker type and having two spaced apart parallel bus bars and a plurality of circuit breaker assemblies extending across the bus bars. Each of the circuit breaker assemblies comprises a pair of circuit breakers disposed in "tandem," that is, in end-to-end relation within a single insulating casing. A locking bar extends parallel to and between the bus bars, at the back of the circuit breaker assemblies, passing through a slot in each of the casings thereof. The locking bar is of non-circular cross-section at its intermediate portion and is rotatable between a locked position in which a major dimension of the locking bar is positioned transverse to the bus bars and an unlocked position in which a minor dimension is positioned transverse to the bus bars. The slot provided in each of the circuit breaker assemblies has a narrow entry portion sufficiently wide to permit passage of the locking bar when in its unlocked position but too small to permit passage of the locking bar when in its locking position. Thus, when the locking bar is rotated to its locked position it locks all circuit breakers in place, and when rotated to its unlocked position, it frees them all for removal. A spring catch is provided for retaining the locking bar in its locked position, and is so disposed and arranged so as to be accessible for movement to a releasing position only by partially disassembling the panel. Since such disassembly is unlikely to be attempted by an unauthorized person, the unauthorized addition or removal of circuit breakers is effectively prevented.

The invention, as well as additional objects and advantages thereof, will be readily understood from the following detailed description of one particular embodiment, and its scope will be pointed out in the appended claims.

Figure 1:
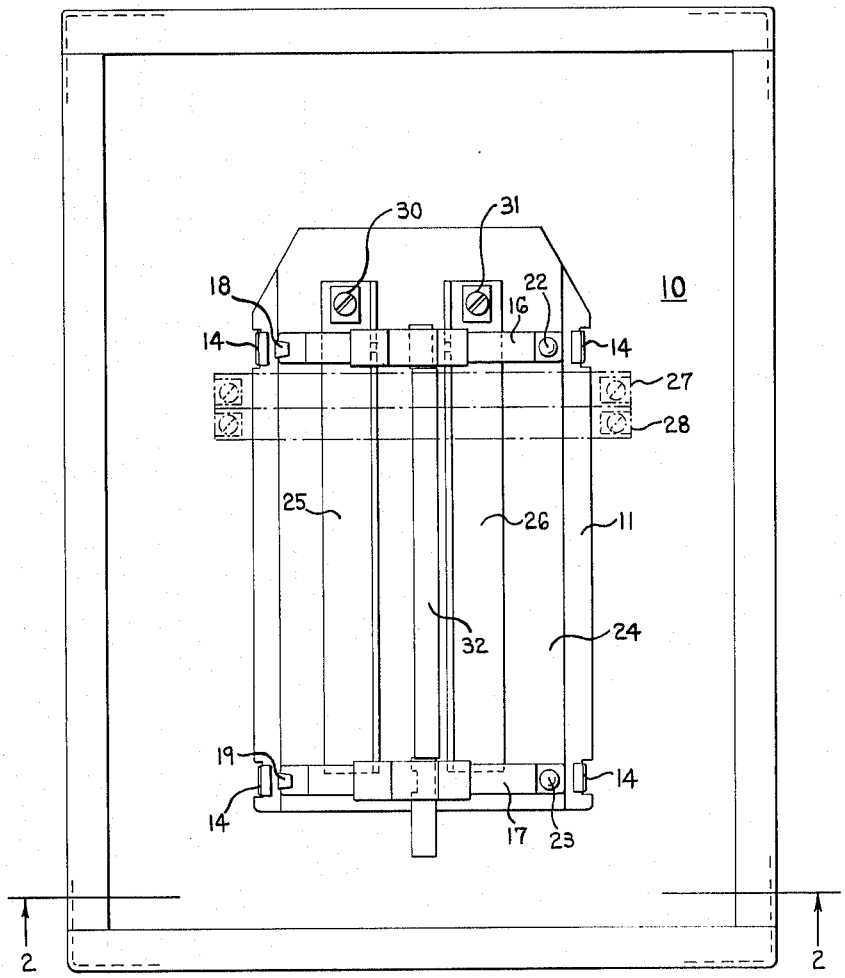
FIGURE 1 is a plan view of the interior of a circuit breaker panelboard constructed in accordance with this invention showing two circuit breaker assemblies in place.
Figure 2:
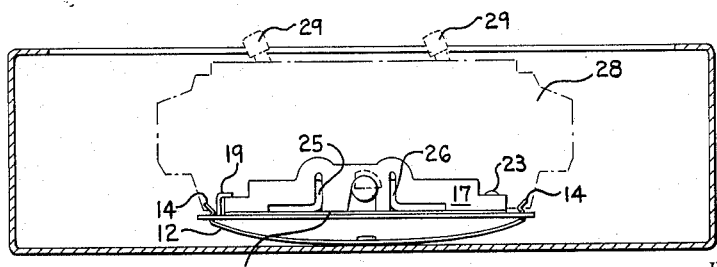
FIGURE 2 is a cross-sectional view taken on line 2—2 of FIGURE 1.

In FIGURES 1 and 2 the invention is shown as embodied in an electrical circuit breaker panelboard comprising a main box-like enclosure 10 within which is mounted a supporting plate 11 termed a saddle. Saddle 11 is preferably retained within the housing by spring strips 12 in a manner described in U.S. Patent 2,876,394, issued to C. E. Gerrish on March 3, 1959, and assigned to the same assignee as the present invention. Spring strips 12, curved in shape, are securely fastened in substantially tangential relationship to the back wall of the enclosure 10. The outer ends of the spring strips are free to move toward and away from the back wall of the enclosure against their own inherent resilience. The distance between these free ends varies, however, during such movement; the distance being greater when they are pressed toward the back wall than when they are moved away from the wall. The free ends of these spring strips carry integral retaining clips 14 to engage an edge of the aforesaid saddle plate 11.

At opposite ends of the saddle plate are mounted support blocks 16 and 17 respectively, which are retained thereon by engagement beneath retaining elements 18 and and 19, which are struck out from the left-hand side of the saddle plate as seen in FIGURES 1 and 2, and by rivets 22 and 23 on the right-hand side. Support blocks 16 and 17 are preferably formed of a rigid insulating material such as a phenolic resin. Beneath these support blocks and extending the length of the saddle plate 11 a sheet 24 of insulation is positioned. Between the two insulating members thus provided, bus conductors 25 and 26 are retained, being held within grooves of complementary configuration formed within the support blocks 16 and 17. The bus conductors 25 and 26 are shown to be of an L-shaped cross-section with one portion of each conductor upstanding for the purpose of mating with cooperative plug-in type terminals of circuit breakers 27 and 28 mounted thereon. The bus conductors are provided at their upper ends as seen in FIGURE 1 with terminal assemblies 30 and 31 respectively for connection to a source of electrical power. The circuit breakers 27 and 28 illustrated are shown to be of a type having two switch mechanisms in a single housing. The contact mechanisms, not shown, are operated as best seen in FIGURE 2, by switch handles 29, which may be connected mechanically together for simultaneous operation if desired.

Extending the length of the internal assembly contained within the panelboard enclosure and lying parallel to and between the bus conductors 25 and 26 a locking bar 32 formed of a rigid insulating material is positioned. This locking bar is mounted for rotation within support blocks 16 and 17 for movement about an axis parallel to its length. As will be seen, a single partial rotation of blocking bar 32 effectively locks all circuit breakers on the bus conductors, and a single reverse motion releases all of them simultaneously.

Figure 3:
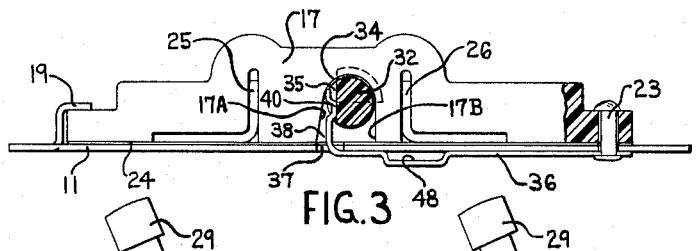
FIGURE 3 is an enlarged detail view, partially in section, of a portion of FIGURE 2 illustrating the locking bar in locked position.

Turning now to FIGURE 3, it can be seen that the support block 17 contains a circular aperture 34 therethrough which serves as a journal for the locking bar 32. Adjacent the aperture 34, a portion of the block 17 is cut away to provide a recess 38 having shoulders 17A and 17B, for a purpose to be described. The cross section of that portion of the locking bar journalled within the supporting block 17 is circular except for a segment removed to form a flat surface 35. A locking spring 36 affixed at one end beneath rivet 23 extends along the underside of saddle 11, up through an opening 37 in the saddle plate and through the recess 38 in support block 17 to terminate at its opposite end in an interference tab 40 which normally rests on the flat surface 35 of the locking bar 32. The cooperation between the interference tab 40 of locking spring 36 and the shoulder 17A of the recess 38 normally prevents the locking bar from being rotated clockwise from the locking position shown in FIGURE 3. Thus attempted clockwise rotation of the bar 32 tends to move the tab 40 to the left as viewed. Such movement is prevented, however, by engagement of the tab 40 with the shoulder 17A. Counterclockwise rotation of the bar 32 is prevented by the portions 47, to be described, of the casings of the circuit breakers 28.

The opposite end of the locking bar is journalled within support block 16. It is unnecessary, however, to provide another locking spring at the opposite end of the locking bar.

Figure 4:
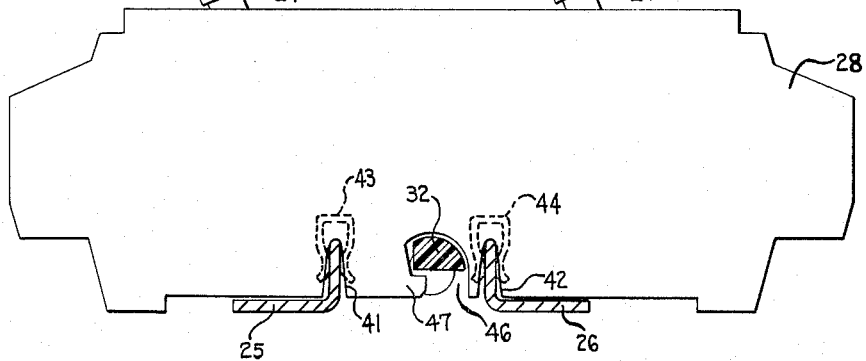
FIGURE 4 is an enlarged detail view, partially in section, illustrating the cooperation between a circuit breaker and the locking bar with the latter in locked position.

In FIGURE 4, circuit breaker 28 is shown plugged onto bus bars 25 and 26. The upstanding portions of bus bars 25 and 26 pass through slots 41 and 42 in the circuit breaker housing and are fricitonally engaged by plug-in line terminals 43 and 44 respectively, the latter being electrically connected by means not shown to the switching means within the circuit breaker housing. It can be seen here that the cross section of the locking bar intermediate its journalled ends is noncircular. In the locking position shown in FIGURE 4, the locking bar 32 has a major dimension aligned horizontally and a vertically aligned minor dimension. The slot 46 in the circuit breaker housing through which the locking bar extends has a constricted entry portion defined in part by a latching lip 47, which also provides locking surfaces within the slot. The width of the constricted entry portion thus formed is insufficient to permit the passage therethrough of the locking bar 32 when it is in the position shown in FIGURE 4. Thus those circuit breakers plugged onto the panelboard bus bars cannot be removed from engagement with the bus bars nor can other circuit breakers of similar configuration be attached while the bar is in this position.

Figure 5:
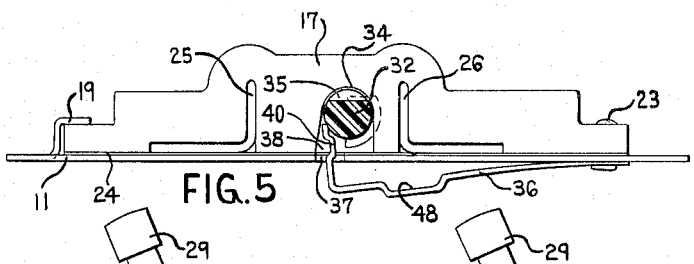
FIGURE 5 is a view similar to FIGURE 3 showing the locking bar in unlocked position.

Rotation of the locking bar 32 through ninety degrees, however, interchanges the positions of the major and the minor axes of locking bar 32 to permit the installation or removal of circuit breakers. As seen in FIGURE 5, locking bar 32 may be rotated by first releasing the locking spring 36 from the engagement of its interference tab 40 with the slot in the bearing portion of the locking bar. This is accomplished by inserting a screwdriver or similar instrument in the space provided between the base of saddle plate 11 and an unlocking loop 48 provided in the locking spring. When this is done the interference tab 40 on the locking spring may be removed from the slot in locking bar 32 to the position shown in FIGURE 5 and the locking bar may be rotated through ninety degrees to the position also shown therein.

Figure 6:
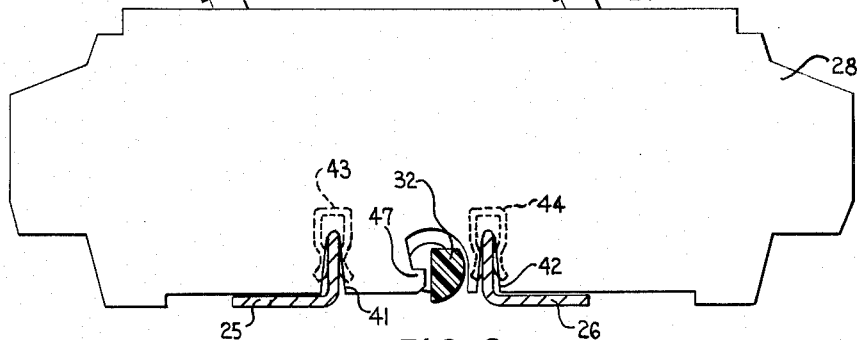
FIGURE 6 is a view similar to FIGURE 4 showing the locking bar in unlocked position.

As best seen in FIGURE 6, rotation of the locking bar places it in an unlocked condition with its minor axis transverse to the bus bars 25 and 26 and its major axis vertical to the bus bar assembly. In this position, the width of the locking bar is small enough to pass easily through the constricted portion of the slot 46 provided in the circuit breaker housing. It will be observed that the locking strip 36 can be moved to releasing position only by access to the back or underside of the plate or saddle 11. As will be seen from FIGURES 1 and 2, such access can be had only by disengaging the saddle 11 from its supports 12. Such partial disassembly would not ordinarily be attempted by unauthorized persons. Thus the invention provides a simple and effective means for preventing the removal or insertion of circuit breaker by unauthorized personnel.

It will also be seen that with a single motion all circuit breakers plugged onto the panelboard assembly may be instantly unlocked for removal and that a simple reverse motion locks will circuit breakers on the panelboard simultaneously. The locking arrangement thus provided is simple, rugged and reliable. It has no loose parts which can be misplaced when the panelboard is being worked upon.

While but a single embodiment of this invention has been disclosed, it will be appreciated that many modifications thereof may readily be made by those skilled in the art to which the invention pertains and it is therefore intended by the appended claims to cover all such modifications as fall within the true spirit and scope of this invention in its broader aspects. Thus, for example, while the invention has been shown as used with manually operable circuit breakers, it will be readily apparent that it is equally usable with other types of electrical control devices such as switches and fuse-blocks.

What we claim as new and desire to secure by Letters Patent of the United States is:

1. An electrical panelboard comprising:
   (a) a supporting base;
   (b) a pair of parallel bus bars carried by said supporting base;
   (c) a plurality of circuit breaker assemblies adapted to be mounted in a row in superimposed relation to said bus bars, each of said circuit breaker assemblies comprising at least two circuit control devices and means for connecting said circuit control devices to said bus bars respectively;
   (d) an elongated locking bar rotatably mounted on said base and extending between and parallel to said bus bars;
   (e) each of said circuit breaker assemblies having a slot in the portion thereof adjacent said supporting base disposed and arranged to receive said locking bar, said slot having a relatively narrow entrance portion and a relatively wide inner portion;
   (f) said locking bar having a non-circular cross-section having a minor dimension in a first direction and a major dimension in a second direction at right angles to said first direction;
   (g) said locking bar being rotatable between a non-locking position in which said major dimension extends parallel to said entrance portion of said slot and permits insertion and removal of said circuit breakers and a locking position in which said major dimension extends transversely of said entrance portion of said slot and prevents insertion and removal of said circuit breakers, and
   (h) releasable locking means normally preventing rotation of said locking bar from said locking to said non-locking position.

2. An electrical panelboard comprising:
   (a) a supporting base;
   (b) a pair of parallel bus bars carried by said supporting base;
   (c) a plurality of circuit breaker assemblies adapted to be mounted in a row in superimposed relation to said bus bars, each of said circuit breaker assemblies comprising at least two circuit control devices and means for connecting said circuit control devices to said bus bars respectively;
   (d) an elongated locking bar rotatably mounted on said base and extending between and parallel to said bus bars;
   (e) each of said circuit breaker assemblies having a slot in the portion thereof adjacent said supporting base disposed and arranged to receive said locking bar said slot having a relatively narrow entrance portion and a relatively wide inner portion;
   (f) said locking bar having a non-circular cross-section having a minor dimension in a first direction and a major dimension in a second direction at right angles to said first direction;
   (g) said locking bar being rotatable between a non-locking position in which said major dimension extends parallel to said entrance portion of said slot and permits insertion and removal of said circuit breakers and a locking position in which said major dimension extends transversely of said entrance portion of said slot and prevents insertion and removal of said circuit breakers, and
   (h) releasable locking means normally preventing rotation of said locking bar from said locking to said non-locking position said locking means being accessible for movement from said released position only from the side of said support opposite said circuit control devices.

3. An electrical panelboard comprising:
   (a) a generally rectangular box-like enclosure having a back wall and an open front wall;
   (b) a generally planar supporting base;
   (c) means releasably mounting said supporting base on said back wall of said enclosure;
   (d) a pair of parallel bus bars mounted on said supporting base;
   (e) a plurality of circuit control device assemblies adapted to be mounted in a row in superimposed relation to said bus bars on said base, each of said circuit control device assemblies comprising at least two electric circuit control devices within a common insulating casing, and means for connecting said devices to said bus bars respectively;
   (f) an elongated locking bar rotatably carried by said supporting base and extending between and parallel to said bus bars;
   (g) each of said circuit control device assembly casings including a slot disposed and arranged to receive at least a portion of said locking bar when said assemblies are in mounted position on said supporting base;
   (h) said locking bar being rotatable between a locked position in which said bar extends through said recesses in locking relation to said assembly casings to prevent removal of said circuit control device assemblies from said support, and an unlocked position in which said locking bar does not interfere with removal of said control device assemblies from said support;
   (i) locking means carried by said supporting base and movable from a first position in which it prevents rotation of said locking bar to a second position in which it does not interfere with rotation of said locking bar, said locking means being accessible for movement from said first position to said second position only from the side of said supporting base opposite said circuit control device assemblies;
   (j) whereby unauthorized persons are substantially deterred from removing or replacing said circuit control device assemblies.

4. An electrical panelboard comprising:
   (a) a supporting base;
   (b) a pair of parallel bus bars mounted in fixed relation with respect to said base;
   (c) a plurality of circuit control device assemblies adapted to be mounted in a row on said bus bars, said control device assemblies having contact terminals arranged for frictional engagement with said bus bars and each having a housing having a slot therethrough adjacent its side contact terminals;
   (d) an elongated locking bar rotatably mounted in fixed relation to said base and extending parallel to said bus bars, said locking bar being rotatable between a locked position in which said locking bar extends through the aforesaid slots in each of said housings in locking relationship thereto to prevent the removal of said circuit breaker assemblies from said bus bars and an unlocked position in which said locking bar does not interfere with the removal of said circuit breaker assemblies.

5. An electrical panelboard comprising:
   (a) a supporting base;
   (b) at least a pair of parallel bus bars mounted in insulated relation on said base;
   (c) one or more circuit control device assemblies adapted to be mounted on said bus bars, said control device assemblies each having a housing with contact terminals arranged therein for frictional engagement with said bus bars, each of said housings having a slot with a narrow entry portion therethrough;
   (d) an elongated rotatably mounted locking bar of non-circular cross section mounted on said supporting base and extending parallel to said bus bars through the slot in each of said circuit breaker assemblies, the portion of said locking bar passing through the slots in the housings of said circuit breaker assemblies having a major cross sectional dimension wider than the entry portion of said slots and a minor cross sectional dimension narrower than the entry portion of said slots, said locking bar being rotatable about an axis parallel to its length beween a locked position in which said major dimension is positioned transverse to said entry portion and an unlocked position in which said minor dimension is positioned transverse to said entry portion.

6. An electrical panelboard comprising:
(a) a supporting base;
(b) a pair of parallel bus bars mounted in fixed relation with respect to said base;
(c) a plurality of circuit breaker assemblies mounted in a row on said bus bars, said circuit breaker assemblies each having a pair of contact terminals in frictional engagement with said bus bars and each having a slot therethrough between its said contact terminals;
(d) an elongated rotatably mounted locking bar mounted in fixed relationship with respect to said base extending parallel to and between said bus bars, said locking bar being rotatable between a locked position in which said locking bar extends through the aforesaid slots in each of said circuit breaker assemblies in locking relationship thereto to prevent the removal of said circuit breaker assemblies from said bus bars and in unlocked position in which said locking bar does not interfere with the removal of said circuit breaker assemblies.

7. An electrical panelboard comprising:
(a) a supporting base;
(b) at least a pair of parallel bus bars mounted in insulated relation on said base;
(c) one or more circuit breaker assemblies adapted to be mounted on said bus bars, said circuit breaker assemblies having contact terminals arranged for frictional engagement with said bus bars, each of said circuit breaker assemblies having a slot with a narrow entry portion therethrough between said contact terminals;
(d) an elongated rotatably mounted locking bar of non-circular cross section mounted on said supporting base and extending parallel to and between said bus bars through the slot in each of said circuit breaker assemblies, the portion of said locking bar passing through the slots in said circuit breaker assembly having a major cross sectional dimension wider than the entry portion of said slots and a minor cross sectional dimension narrower than the entry portion of said slots, said locking bar being selectively rotatable about an axis parallel to its length between a locked position in which said major dimension is positioned transverse to said entry portion and an unlocked position in which said minor dimension is positioned transverse to said entry position.

8. An electrical panelboard assembly comprising:
(a) a supporting base;
(b) a pair of support members mounted in spaced apart relationship on said base;
(c) a pair of parallel bus bars mounted in insulated relationship on said base by said support members to extend across the space therebetween;
(d) an elongated rotatably mounted locking bar journalled in both of said support members for rotational movement therein and extending parallel to and between said bus bars, said locking bar being of non-circular cross section intermediate said support members;
(e) a plurality of circuit breaker assemblies adapted to be mounted in a row between said support members, such of said circuit breaker assemblies including a pair of contact terminals for frictional engagement with said bus bars, and a switch housing having a slot with a narrow entry portion therethrough between the associated pair of contact terminals for engagement with said locking bar;
(f) said locking bar being selectively rotatable between a locked position in which it cooperates with the aforesaid narrow entry portions of the slots in said switch housings to prevent the removal of said circuit breaker assemblies from said bus bars and an unlocked position in which it is free to pass through the narrow entry portions of the slots in said switch housings.

9. An electrical panelboard assembly comprising:
(a) a supporting base;
(b) a pair of support members mounted in spaced apart relationship on said base;
(c) a pair of parallel bus bars mounted in insulated relationship on said base by said support members to extend across the space therebetween;
(d) an elongated rotatably mounted locking bar journalled in both of said support members for rotational movement therein and extending parallel to and between said bus bars;
(e) a plurality of circuit breaker assemblies adapted to be mounted in a row between said support members, each of said circuit breaker assemblies including a pair of contact terminals for frictional engagement with said bus bars, and a switch housing having locking surfaces thereon between the associated pair of contact terminals for engagement with said locking bar;
(f) said locking bar being rotatable between a locked position in which it cooperates with the aforesaid locking surfaces of said switch housings to prevent the removal of said circuit breaker assemblies from said bus bars and an unlocked position in which it does not engage said locking surfaces and does not interfere with the removal of said circuit breaker assemblies, and
(g) means for latching said locking bar in its locked position including an elongated spring member having one end fixed with respect to said supporting base and its other end extending into interfering relationship with a portion of said locking bar to prevent said locking bar from being moved from locked to unlocked positions, said other end of said spring member being resiliently displaceable from interfering relationship to unlatch said locking bar.

10. An electrical panelboard assembly comprising:
(a) a supporting base;
(b) a pair of support members mounted in spaced apart relationship on said base;
(c) a pair of parallel bus bars mounted in insulated relationship on said base by said support members to extend across the space therebetween;
(d) an elongated rotatably mounted locking bar journalled in both of said support members for rotational movement therein and extending parallel to and between said bus bars, said locking bar being of non-circular cross section intermediate said support members;
(e) a plurality of circuit breaker assemblies adapted to be mounted in a row between said support members, each of said circuit breaker assemblies including a pair of contact terminals for frictional engagement with said bus bars, and a switch housing having a slot with a narrow entry portion therethrough between the associated pair of contact terminals for engagement with said locking bar;
(f) said locking bar being rotatable between a locked position in which it cooperates with the aforesaid narrow entry portions of the slots in said switch housings to prevent the removal of said circuit breaker assemblies from said bus bars and an unlocked position in which it is free to pass through the narrow entry portions of the slots in said switch housings;

(g) means for latching said locking bar in its locked position including an elongated spring member having one end fixed with respect to said supporting base and its other end extending into interfering relationship with a portion of said locking bar to prevent said locking bar from being moved from locked to unlocked positions, said other end of said spring member being resiliently removable from interfering relationship to unlatch said locking bar.

References Cited by the Examiner
UNITED STATES PATENTS 2,876,394   3/1959   Gerrish _____ 317—119

ROBERT K. SCHAEFER, *Primary Examiner.*

ROBERT S. MACON, *Assistant Examiner.*